United States Patent

Polhemus

[15] 3,683,378
[45] Aug. 8, 1972

[54] HEADING ERROR COMPUTER

[72] Inventor: William L. Polhemus, Ann Arbor, Mich.

[73] Assignee: Polhemus Navigation Sciences, Inc., South Burlington, Vt.

[22] Filed: May 29, 1969

[21] Appl. No.: 829,062

[52] U.S. Cl.............................343/7 ED, 235/150.26
[51] Int. Cl..............................G01s 7/10, G06g 7/22
[58] Field of Search.........235/150.2, 150.25, 150.26; 343/7 ED

[56] References Cited

UNITED STATES PATENTS

| | | | |
|---|---|---|---|
| 2,794,594 | 6/1957 | Ergen et al........235/150.26 X |
| 3,181,152 | 4/1965 | Tholey.................343/7 ED X |
| 3,377,470 | 4/1968 | Ausman................235/150.26 |

Primary Examiner—Malcolm F. Hubler
Attorney—Olsen and Stephenson

[57] ABSTRACT

Apparatus for electronically and/or electromechanically computing the heading error angle of the heading or directional sensor of a ship or aircraft equipped with navigation systems having a mapping radar and/or electronic, optical or other viewing service and a computer with offset sighting capability; the apparatus being also capable of averaging several values of the computed heading error angle and computing the rate of drift or precession of the heading sensor. In addition, the averaging and drift rate computing sections of the computer can be used to mechanize calculation of average heading error and azimuth drift rate in aircraft which do not possess the required radar and offset sighting capabilities.

14 Claims, 4 Drawing Figures

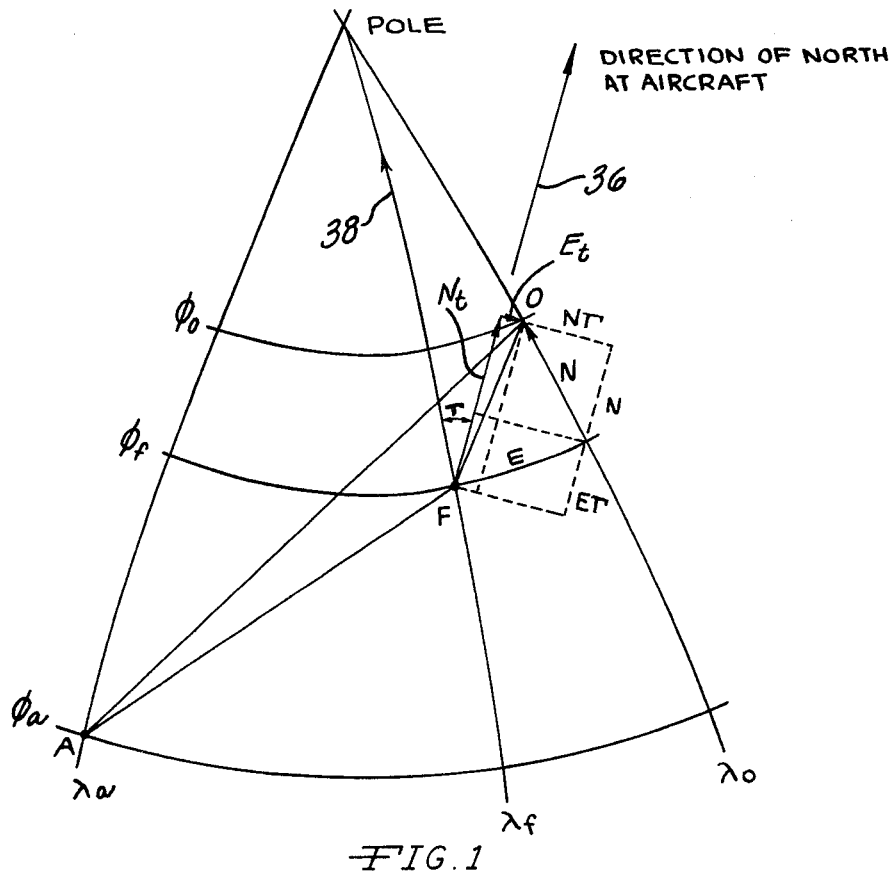
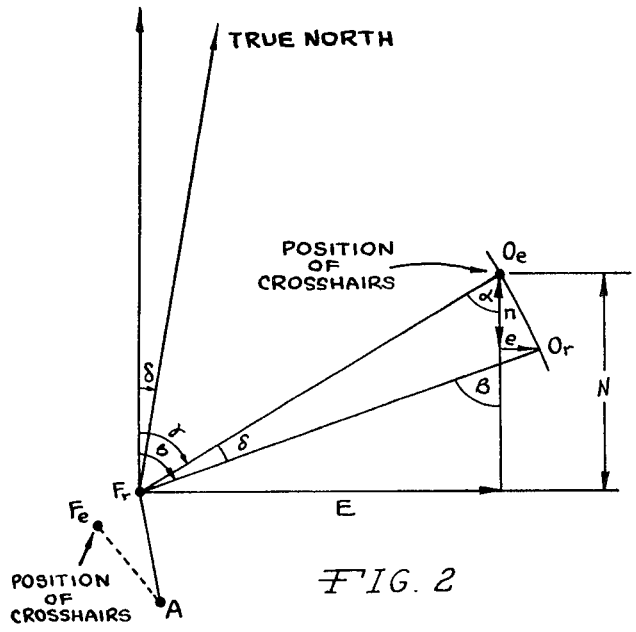
FIG. 1
FIG. 2
INVENTOR
WILLIAM L. POLHEMUS
BY Olsen and Stephenson
ATTORNEYS

HEADING ERROR COMPUTER

BACKGROUND OF THE INVENTION

1. Field of the Invention

The present invention relates to navigational systems on ships or in aircraft and relates more specifically to a unit which enables the measurement and correction of errors in the heading reference section of a vehicle's navigational system, the section which indicates the azimuth orientation of the ship or aircraft.

2. Description of the Prior Art the navigational capabilities of ships or aircraft can be no better than the accuracy with which the heading of the ship or aircraft is established. In present day aircraft, several types of heading reference systems having various degrees of accuracy are in use. The following list includes some of the more common heading reference systems arranged in the order of increasing accuracy (standard deviation values for a 4 hour flight):

| | |
|---|---|
| Free gyro compass | 2.5 degrees |
| Gyro-magnetic compass | 2.0 degrees |
| Twin gyro platform | 1.0 degrees |
| Inertial platform | 0.5 degrees |

Except for the gyro-magnetic compass, heading error in the above listed systems is a function of gyro drift and is therefore time dependent so that in flights of longer than 4 hours, heading error becomes an even greater problem.

In view of the importance of heading accuracy, it is unfortunate that very few means exist in present aircraft to measure and correct errors in the heading reference during flight to enable highly accurate navigation and bombing.

The principal and most accurate heading error check is that obtained by sighting the stars with a sextant or astro tracker. Heading error can be measured to an accuracy of 1.0° with a manually-operated periscopic sextant. Heading accuracy of this degree leads to a substantially improved operational capability of the aircraft. Heading error can be measured to an accuracy of 0.1° with an automatic astro tracker and its associated sighting reduction computer, providing further improvement in operational capability.

For free gyro and inertial systems, a second means of checking heading error is available through use of the magnetic flux detector in the gyro-magnetic compass. The accuracy of the magnetic system, however, is limited to about 2°.

A third technique is available in which the operator estimates the heading error from an examination of the aircraft's track history. This technique is presently employed in a completely manual procedure. From each position fixing operation, the operator obtains the cross-track deviation of the aircraft from the intended track. By dividing the difference in a cross-track errors at successive fixes by the distance between fixes, the operator establishes the track-angle error.

Assuming that the estimation of drift due to wind is correct (wind drift angle may be provided by a doppler radar, a driftmeter or an inertial system or by solution of the wind triangle), and that the proper portion of track-angle error due to drift and computer is removed, the remainder of track-angle error can be attributed to the error in the heading reference.

The operator may now use the estimated heading error to directly correct the heading system. Although this procedure makes a number of assumptions which may not find absolute mathematical support, it has been found from operational experience that its application generally results in a significant improvement in the performance over an unmonitored heading system.

All of the present means for measuring heading error have serious operational or accuracy limitations. The celestial sighting procedure is limited by visibility and cannot be used when the sky is obscured. This limitation generally precludes the use of celestial sighting systems during low altitude flight. If a manual sextant is used to do the celestial sighting, a significant operator work load is involved in the pre-computation of star sighting angles, the observation of the star with the sextant and the subsequent computation of the sighting information to obtain heading error. This work load must be carried out by a specialist crew member other than the pilot and is therefore only employed when there is a full-time navigator. Use of a manually-operated sextant also requires that the observer leave his seat in order to make the observations, a highly undesirable requirement during high speed, low altitude flight. The magnetic checking procedure, as explained, is limited by its accuracy to the role of a gross check on heading error.

The track history technique is also limited by the work load involved and is only used in aircraft having a full-time navigator. There is also a time lag in the track history procedure because an estimation of the error is not available until at least two position fixes have been obtained. The track history procedure directly measures only the track angle error rather than the heading error, the assumption made in the case of gyro drift combination, that the track angle error approximately equals the heading error is reasonable only if the wind drift angle is constant. If there are significant changes in winds or in the intended track between fixes, the estimation procedure itself may have large errors. Since the drift rate operation is applied to future track legs, subsequent changes in wind or track angle affect the accuracy of the correction. Thus, the track history technique must be applied very carefully by an experienced operator who is cognizant of the restraints imposed by flight conditions.

Still another problem with the prior art is that of verifying the vehicle's heading during polar operations. The difficulty in measuring heading error near the poles is attributable to the cumbrousness of the conventional method which requires steering by free gyro and using an arbitrary reference direction called grid North. The procedures employed to implement this method, including gyro-rating graphs and tabulations are prone to error and are, at best, time consuming to complete.

SUMMARY OF THE INVENTION

This invention is a method and apparatus for measuring heading error in the navigational system of a ship or aircraft. The method makes use of the mapping radar and offset sighting capabilities which are available in the navigational systems of many military aircraft. The basic procedure of the invention is: first, to choose two radar sighting points which give a good radar return and whose positions are known; second, to correct the navigation system's knowledge of the present position of the aircraft (latitude, longitude) based on the radar return from the first radar sighting aimpoint; finally, using the information as to the exact range from the aircraft to the first radar sighting aimpoint (and the known distance and bearing of the second radar aimpoint with respect to the first), the navigation system computes the position of the second radar sighting aimpoint with respect to the aircraft. If the radar return from the second sighting aimpoint fails to correspond with the navigation system's computation of the position of that aimpoint, then any error is due to the heading error of the aircraft.

A more detailed outline of the procedure entailed in computing the heading error angle from radar sightings of two known aimpoints is as follows:

1. Select two radar sighting aimpoints, F and O, whose positions are known;

2. Scan point F with the radar to determine the exact range of F from the aircraft;

3. Correct the navigation system's knowledge of the aircraft's computed present position (latitude, longitude) so that this position corresponds with the correct range distance from the aircraft to F;

4. Based on the known positions of F and O, compute the vector $FO_e$ using computing equipment in the existing navigation system where $O_e$ is the expected position of the radar return from aimpoint O on the radar screen;

5. Drive the cross hair indices on the radar screen to the point $O_e$. The cross hairs are driven based on vector information generated in the previous step. The cross hairs are stabilized to the heading reference section of the navigation system and thus their position $O_e$ will include any heading error;

6. Scan the second radar aimpoint O and observe the radar return $O_r$, the true or actual position of the return from aimpoint O on the radar display;

7. If the radar return $O_r$ does not correspond with the cross hairs positioned on the display at point $O_e$, The discrepancy is due only to the heading error (introduced because the cross hairs are stabilized to the heading reference. Hence, the angle $O_rFO_e$ is the heading error angle, assuming no other errors in the navigation system or radar equipment.

The procedure of the present invention can be implemented as a manual procedure with existing navigation equipment on some aircraft to obtain the heading error angle. This is done by manually changing the N, E coordinates which determine the vector $FO_e$ until the radar display cross hairs line up with the radar return at point $O_r$ on the display; this alteration of the N, E coordinates to N', E' produces a new vector $FO_r$. By using the original N, E coordinates of the vector $FO_e$ and the new vector $FO_r$ determined by N', E', the small angle between the two vectors can be calculated, this angle is the heading error angle.

The electromechanical apparatus of this invention uses output signals from the navigation system generated by the seven step procedure listed above to calculate the heading error angle. The four output signals from the navigation system which are used to calculate the heading error angle are the North and East coordinates of point $O_e$ with respect to point F and the North and East components of a displacement vector which is generated when the cross hairs at position originally at point $O_e$ are manually trimmed to the point $O_r$. Two other subsystems of the apparatus can average up to eight values of the heading error angle to obtain a more statistically accurate estimate of heading error angle to obtain a more statistically accurate estimate of heading error and compute the drift rate of the heading error. The drift rate is computed by dividing the difference between two of the averaged values of the heading error angle by the time elapsed between the acquisition of the two averages.

From the above discussion of the manual procedure, it can be seen that the method of this invention can be implemented on aircraft having the requisite remote sensor (e.g. mapping radar, infra-red mapper or other optical sensor) and offset sighting capabilities without additional equipment because the heading error can be calculated from outputs readily available from the navigation system of such aircraft. The electromechanical computation apparatus mechanizes the calculation of heading error, averaged heading error and azimuth drift rate based on outputs generated by the procedure outlined above. Since radar is used, the heading error may be calculated under any weather conditions; the radar also makes possible an order of magnitude improvement in the accuracy of the heading reference.

Further objects, features and advantages of this invention will become apparent from a consideration of the following description, the appended claims and the accompanying drawing in which:

FIG. 1 is a line drawing of the offset aimpoint sighting geometry illustrating the effect of the map angle and the method of resolution of offset distances employed in high accuracy navigation systems;

FIG. 2 is a line drawing illustrating the computation of error angle from the relationship between the first radar sighting aimpoint F, the expected radar aimpoint $O_e$ (where the cross hairs are positioned) and the actual radar return point $O_r$;

DESCRIPTION OF THE PREFERRED EMBODIMENT

Figure 3:
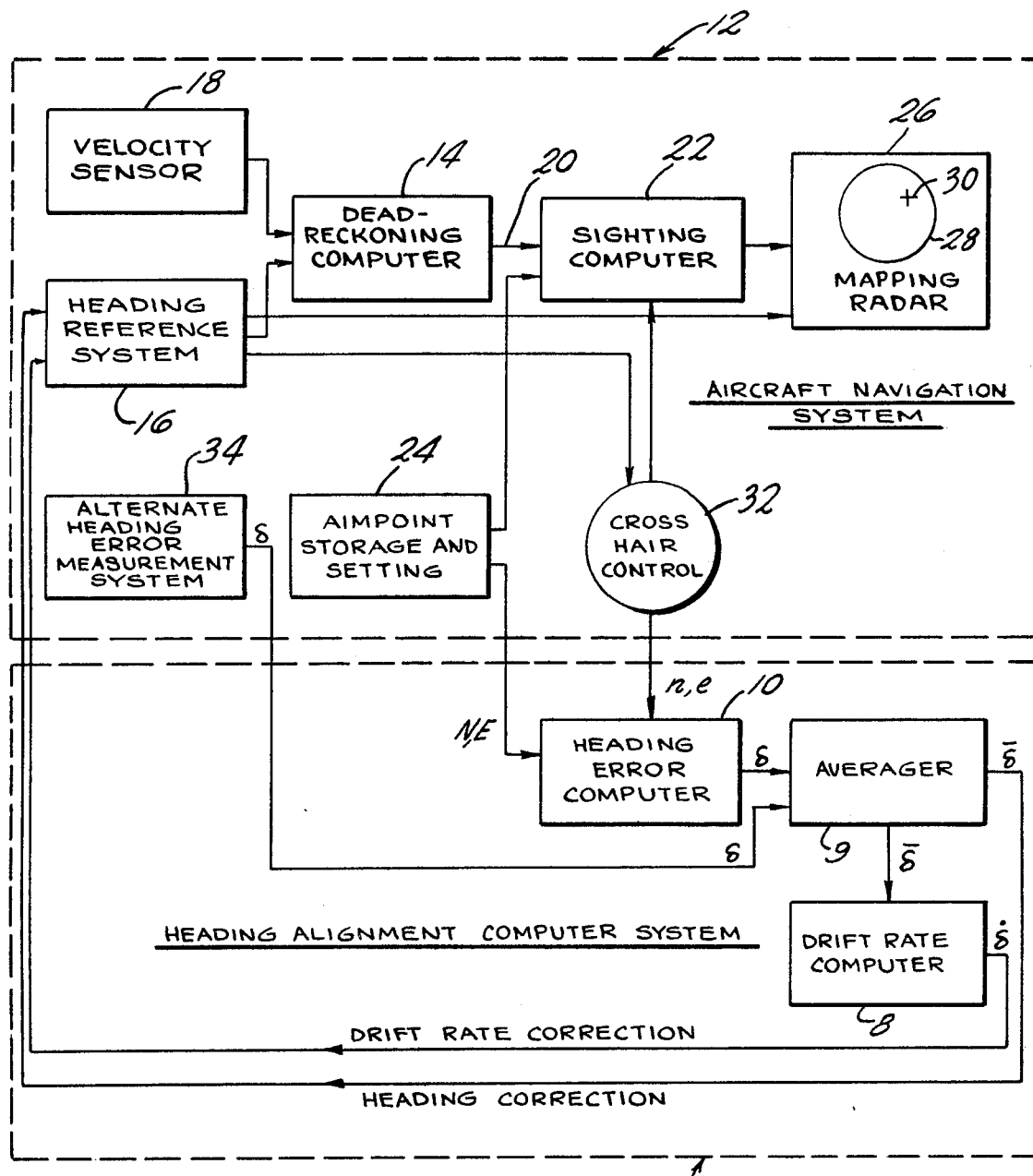
FIG. 3 is a block diagram of the system showing the relationship of the elements of the heading alignment computer system to the relevant components of the existing navigation system in the aircraft.

The heading alignment computer system indicated generally at 7 in FIG. 3 comprises a drift rate computer 8, an averager 9 and a heading error computer 10 and is shown in conjunction with a navigation system indicated generally at 12 which includes the following components:

a. a dead reckoning computer system 14 using inputs from a heading reference system 16 and a velocity sensor 18 to compute continuously the present position of the aircraft in longitude and latitude coordinates for input to b. a sighting computer 22 which calculates the bearing and distance from the aircraft's computed present position to selected radar sighting aimpoints. Two types of aimpoints are used. The first is a fixpoint F which is defined in terms of geographical coordinates (latitude and longitude) and which is placed in storage or manually set into a fixpoint panel, not shown, which is a part of an aimpoint storage and setting system 24. The second type of aimpoint is an offset aimpoint O which is defined in terms of its distances North and East of the fixed point F; these North and East distances are placed in storage or manually set into the offset panel, now shown, which is also a part of the aimpoint storage and setting system 24.

c. A mapping radar system 26 capable of receiving radar signal returns from topographic features of the terrain over which the aircraft is flying (such as the topographic features chosen for aimpoints O and F) and capable of displaying a radar return signal on a display screen 28.

Positioned on radar display screen 28 is a pair of cross hair indices 30 which can be driven by the radar system to a position on the screen representing the bearing and distance of a selected aimpoint (such as $O_e$) from the aircraft. The bearing and distance information used to drive cross hairs is computed by the sighting computer 22 based on information obtained from aimpoint storage and setting system 24. If cross hairs 30 are manually adjusted to a second point (such as $O_r$) on screen 28 the North and East coordinates of a vector $(n, e)$ linking the first point on the display with the second point are generated by cross hair control 32. Cross hair control 32 supplies the inputs $(n, e)$ to heading error computer 10 as one of two sets of coordinates from which the heading error is calculated. The other two coordinates required by heading error computer 10 are the North and East components of the offset aimpoint O which are provided by aimpoint storage and setting system 24 to heading error computer 10.

In an aircraft which does not possess a dead reckoning computer, a sighting computer and a mapping radar system, an alternate method of determining average error in heading and gyro drift rate utilizing the heading computer measurement shown diagrammatically as 34 can be employed. This alternate heading error measurement system 34 may comprise a method of measuring the aircraft heading error by such means as the manually-operated periscopic sextant technique which is presently employed for over-water navigation in civil and military aircraft. Since alternate system 34 is a completely self-contained system for computing the heading error, heading error computer 10 is not used and the output from alternate system 34 is placed directly into averager 9 and drift rate computer 8 which mechanize the averaging of eight values of the heading error and the computing of the drift rate. This mechanization frees the navigator from some of the computational chores and displays the outputs on a control panel for easy accessibility.

When the navigation system does contain a dead reckoning computer, a sighting computer and a mapping radar, then the full blown system 7 (shown in FIG. 4) is used and the alternate heading error measurement system 34 is referred to only when the aircraft is over water. As explained, the aimpoint storage and setting system 24 provides the offset coordinates North and East of the distance between offset aimpoint O and fix point and the cross hair control 32 supplies the North and East components of a vector linking the expected radar return point $O_e$ shown in FIG. 2 to which the cross hairs 30 were driven and the position to which the cross hairs were manually trimmed ($O_r$ in FIG. 2) representing the actual radar return from the offset aimpoint O. With these two sets of coordinates, heading error computer 10 computes the heading error and inputs it to the averager 9. Averager 9, in the preferred embodiment, averages up to eight values of heading error $\delta$. The output of averager 9, the average of eight values of heading error is called the heading correction $\bar{\delta}_n$ and is input to the heading reference system 16 to correct the heading reference to true North. Heading correction $\bar{\delta}_n$ is also sent to drift rate computer 8 which compares two successive values of $\bar{\delta}_n$ and divides the resulting difference value by the time elapsed between their acquisition to obtain the drift rate correction $\dot{\delta}$ which is also sent to the heading reference system 16 as a value of torque where it cancels undesired gyro drift.

A dead reckoning computer like 14, a sighting computer like 22 and a mapping radar like 26 are included in navigation bombing systems for the purpose of making radar observations with reference to a point O which is offset by a known amount (N,E) from a fixpoint F when fixpoint F is obscured or otherwise not easily identified.

The geometry of a typical radar offset sighting system is shown in FIG. 1. The aircraft is situated at point A, defined by its latitude $\phi_a$ and longitude $\lambda_a$. A radar sighting is desired to a fixpoint F, at $(\phi_f, \lambda_f)$. Since fixpoint F is known to be poorly defined by radar returns, an offset aimpoint O at $(\phi_o, \lambda_o)$ is pre-selected and defined in the offset panel separately in FIG. 3 of aimpoint setting and storage system 22 by its distances North (N) and East (E) of fixpoint F.

In the direct sighting mode, the radar is beamed directly at the fixpoint F, and the sighting computer 22 calculates the range and bearing from the computed aircraft position $(\phi_a, \lambda_a)$ to the fixpoint F at $(\phi_f, \lambda_f)$. Then, on the radar display screen 28 in FIG. 3, cross hair indices 30 are driven to point $F_e$ in FIG. 2 based on the range and bearing calculated by sighting computer 22. If the position determined by sighting computer 22 is correct (that is, based on an accurate knowledge of actual aircraft position and direction) the cross hair indices 30 at $F_e$ will coincide with the radar return point $F_r$ from the fixpoint F on the radar screen 28.

If there is a discrepancy between the position of the cross hairs and the radar return from F, cross hairs 30 can be trimmed manually to fall over the radar return point on screen 28. Manual trimming of cross hairs 30 may be used to generate displacement coordinates from the computed position to the actual radar return point; these coordinates can then be fed to the dead reckoning computer 14 which can use the displacements to recompute the aircraft position; the dead reckoning computer corrects the computer aircraft position. Alternatively the displacement may be used to adjust the values of $\phi_f, \lambda_f$ set in the fixpoint sighting panel. Either procedure is acceptable for use with the heading error computers so long as the operator correctly places the radar cross hairs precisely over the designated aimpoint.

In the offset sighting mode, the radar is beamed toward offset point O. The sighting computer 22 calculates the range and bearing from the aircraft position A at ($\phi_a$, $\lambda_a$) to the fixpoint F to which is added the vector range and bearing between fixpoint F and offset aimpoint O, this range and bearing having been set previously by the operator. The cross hairs 30 on the radar screen 28 are now directed to $O_e$ (FIG. 2), the point of the expected return from offset aimpoint O. If there is an error in heading, $O_e$ will not coincide with $O_r$. When the cross hairs at $O_e$ are manually trimmed to fall over $O_r$ displacement coordinates are generated which are used to calculate the heading error.

It is the capability of the sighting computer 22 in the offset sighting mode to compute range and bearing to a point O offset by known North and East distances from a second known point F, the capability of the cross hair $\tau$ racking control 32 to drive the cross hairs on the display according to the manipulation of the operator, and thereby to generate the displacement coordinates ($n,e$) when cross hairs 30 are trimmed from $O_e$ to $O_r$ which are the capabilities of the existing navigation system utilized in the calculation of heading error by the method and apparatus of the present invention.

The heading error $\delta$ in the aircraft's navigation system can be deduced from the information generated from successive radar observations of two readily identifiable radar sighting points, fixpoint F and offset aimpoint O. The geometry for deducing the heading error angle from this information, the basis of the present invention, is illustrated in FIG. 2.

In FIG. 2, the aircraft is represented by point A, the fixpoint by point F, the offset aimpoint by O. The point $O_e$ is the position of the cross hairs in the offset mode when an error exists. $O_e$ will always be somewhere on a circle whose radius is equal to the vector FO and whose circumference passes through O. Offset point O is positioned with respect to fixpoint F by the North and East distances N and E, respectively. However, in the geometry as shown in FIG. 2, the aircraft navigation system contains an error which is angle $\delta$ thus the vector FO is rotated through the angle $\delta$ causing the cross hairs to fall on point $O_e$. The point $O_r$ represents the true location of the radar return. The displacement coordinates ($n, e$) between point $O_e$ and point $O_r$, are generated by manually trimming the cross hairs 30 from point $O_e$ to fall over $O_r$.

The procedure for measuring the heading error angle is as follows:

1. The radar is first directed to the fixpoint F and the radar cross hairs 30 are adjusted to coincide with the return from F to correct the navigation systems calculation of present aircraft position.

2. The navigation system is then switched to the offset aimpoint mode, the North and East distances ($N, E$) of the offset point O with respect to the fixed point F have been prestored in the offset panel (not shown) of the aimpoint storage and setting system 24 in FIG. 3. The sighting computer 22 then generates the required vector and puts it into the mapping radar 26 and causes the cross hairs 30 to be driven to the expected offset point $O_e$. Any failure of the cross hairs 30 to coincide with the radar return $O_r$, say by falling at $O_e$ will be due to error in heading.

3. Now, if the cross hair indices are moved from point $O_e$ to point $O_r$, the displacement coordinates n and e representing the distance from $O_e$ to $O_r$ will be generated. With N and E from the offset panel in system 24 and (n,e) from cross-hair control 32, it is now possible to calculate the heading error delta using equations 3, 4 and 5:

$$\beta = \text{arc tan } E/N \qquad (3)$$

$$\alpha = \text{arc tan } E+e/N+n \qquad (4)$$

$$\delta = \beta - \alpha \qquad (5)$$

Figure 4:
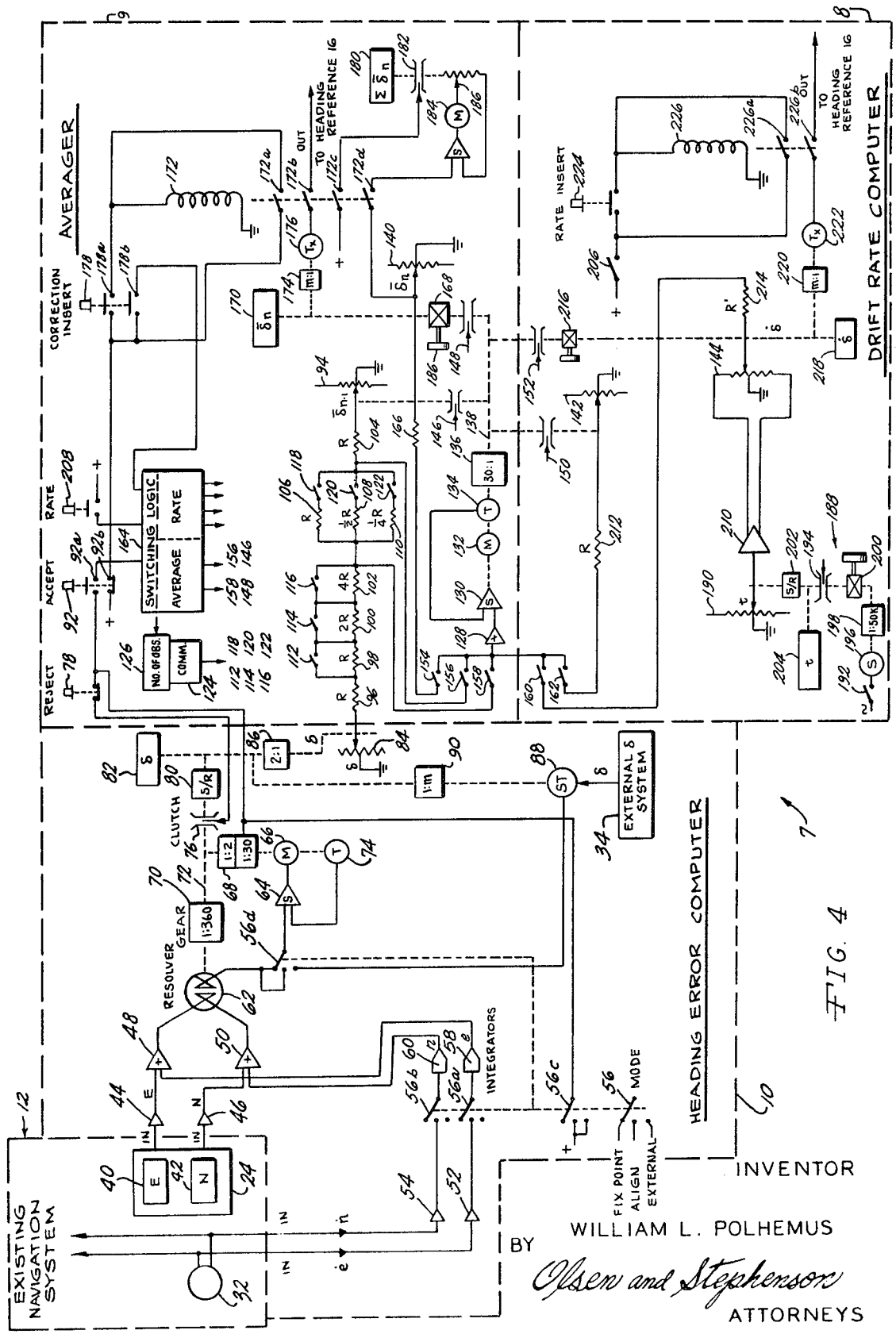
FIG. 4 is a detailed schematic diagram of the electromechanical apparatus of this invention comprising a heading error computer, an averager and a drift rate computer.

Since the signals $N$ and $E$, the offset distances from point F to point O, and signals $n$ and $e$ are readily available as outputs from the existing navigation system 12, a simple electromechanical computing chain shown generally at 10 in FIG. 4 may be used to calculate heading error $\delta$.

Although the heading error can be computed from data obtained from one pair of observations of the points F and O, significant improvement in accuracy can be obtained by averaging several discrete observations. In the system of the present invention, the heading error computing chain 10 is followed by an averaging network, shown generally at 9 in FIG. 4, which is capable of averaging up to eight observations of the heading error angle. The output $\bar{\delta}_n$ from averager 9 is the heading correction and is sent to the heading reference system 17 in FIG. 3 to correct the heading error. Averaged heading error $\bar{\delta}_n$ may also be used to calculate the rate of gyro drift in heading reference 16. The drift rate may be calculated by dividing the difference between consecutive averages by the elapsed time between acquisition of those averages. This computation is handled by a drift rate computer shown generally in FIGS. 3 and 4. The output $\dot{\delta}$ from drift rate computer 8 is the drift rate correction and is sent to the heading reference 16 to correct for gyro drift.

The operation of the heading alignment computer system of the present invention is explained by referring to the schematic diagram of FIG. 4 where the entire system is indicated generally at 7. The majority of the components of the system 7 are of conventional construction, are well known in the art and do not require detailed description unless such description is given. The portion of the system 7 comprising the heading error computer is shown generally at 10. The upper right hand portion of system 7, shown generally at 9, comprises the averager. The lower right hand portion of system 7, shown generally at 8, comprises the drift rate computer. The system 7 receives from the offset panels 40 and 42 in aimpoint storage and setting system 24 via the sighting computer 22 (not shown in FIG. 4) of the aircraft navigation system 12, two signals $E$ and $N$ which represent the distances by which the offset aiming point 0 is displaced from the fixpoint F (in the directions of east and north respectively at the location of the aircraft).

Signals $E$ and $N$ are fed one to each of two buffer amplifiers 44 and 46 which present a high input impedance to the incoming signals so that the loading imposed by the system 7 will not affect the other existing uses of the signals in the navigation system 12. The amplifiers 44 and 46 also scale the $E$ and $N$ signals to provide a sensitivity in volts per 1,000 feet which is suitable for the heading error computing mechanism 10. The outputs of the amplifiers 44 and 46 are fed to the summing amplifiers 48 and 50.

The system 7 also receives from the radar cross hair manual control 32 two signals $e$ and $n$ representing the displacement of the cross hairs introduced by the operator in manually trimming them to a desired point. The signals $e$ and $n$ are fed one to each of two buffer amplifiers 52 and 54 which perform similar buffer and scaling functions to amplifiers 44 and 46. The outputs of amplifiers 52 and 54 are fed by way of the multi-pole switch contacts 56a and 56b to the inputs of the integrator networks 58 and 60. The integrator networks 58 and 60 perform integrations of the input signals to provide outputs which represent the distances $e$ and $n$ by which the operator displaces the cross hairs 32 in the east or north direction. The outputs of the integrators 58 and 60 are fed to the summing amplifiers 48 and 50.

In the initial mode (fixpoint) of the switch 56, contacts 56a and 56b are open and the outputs of the integrators 58 and 60 are zero volts. Hence, the summing amplifiers 48 and 50 receive only the offset distance signals $E$ and $N$. The outputs of the summing amplifiers 48 and 50 are fed to the stator coils of a synchro resolver 62. The output from the rotor coil of the synchro 62 is fed to contact 56d which, in both the fixpoint and align modes, feeds the synchro 62 output to a servo-amplifier 64. The output of the servo-amplifier 64 drives a servo motor 66 which through the gear trains 68 and 70 turns the rotor of the resolver 62 to its null signal position.

In the fixpoint mode, the switch contact 56c is open, causing the gear train 68 to be set in a 1:2 ratio. When the resolver 62 is driven to its null, the angular position of the output shaft 72 will represent the angle $\beta$ which is equal to arc tangent of $EN$. The tacho-generator 74 provides a velocity feedback loop in the servo system for damping. The open contact 56c also causes the electrically operated clutch 76 to be disengaged via reject switch 78 which is made. The spring return mechanism drives both the display readout 82 and the potentiometer 84 (by way of the 2:1 gear train 86) to their center positions representing zero degrees.

When the switch 56 is set to the align mode, the contacts 56a and 56b will be closed so that the signals $e$ and $n$ are fed to the integrators 58 and 60. The outputs of the integrators 58 and 60 represent the displacement coordinates $e$ and $n$ made by the operator in moving the radar display cross hairs from the initial position at which the cross hairs fall, point $O_e$ to the actual radar return $O_r$ from the offset aiming point 0. The output $e$ from the integrator 58 is fed together with the output from the E buffer amplifier 44 to the summing amplifier 48 which sums the inputs and outputs $E+e$. Similarly the output $n$ of the integrator 60 is fed together with the output $N$ of the buffer amplifier 46 to the other summing amplifier 50, producing the $N + n$ output. These two outputs $E + e$ and $N + n$ are fed to the stator coils of the resolver 62. In the align mode, the switch contact 56c is made which causes the gear train 68 to be set to a 1:30 ratio and the clutch 76 to be engaged. The servo system will be driven to a new null causing the output shaft 72 to represent the new angle $\alpha$ which is equal to arc tangent $[(E + e)(N + n)]$. At the same time, the display readout 82 will be driven through the clutch 76 to indicate (both the magnitude and sense of the angular difference between the angles $\beta$ and $\alpha$. Angular difference $\delta$ is the desired quantity, the error in the aircraft heading. The wiper of the potentiometer 84 will be driven so that a voltage representing the heading error $\delta$ will appear on the wiper for transmission to the averager 9.

Provision has also be made for the insertion into the averager 9 of an alternative measurement of heading error $\delta$ which may be provided by some other aircraft system 34 such as periscopic sextant or an astrotracker. The input from external system 34 is fed to the stator coils of a synchro control transformer 88. To accommodate the $\delta$ signal from system 34, the mode switch 56 is set to the external mode position where contact 56c is made, causing the gear train 68 to be set to the 1:30 ratio and the clutch 76 to be engaged. Output signal $\delta$ from the rotor coil of the synchro control transformer 88 is fed by way of contact 56d (in the external mode) to the servo amplifier 64; the $\delta$ signal will cause the servo motor 66 to drive through the gear train 68 and clutch 76 and gear train 90 until the output of synchro control transformer 88 is at null. The display readout 82 will then indicate the heading error input $\delta$ from the external system 34 and the potentiometer 84 will generate its analog voltage for transmission to the averager 9.

The averager 9 is mechanized to calculate the average of up to 8 observations of heading error $\delta$. These $\delta$ values are averaged into the previously averaged values of $\delta$, each averaging operation being automatic when the operator presses the accept switch 92. The averager 9 solves the equation: 6

$$\bar{\delta}_n = \bar{\delta}_{n-1} \times n{-}1/n + \delta n/n \qquad 6$$

where
$\bar{\delta}_n$ is the average of $n$ observations
$\bar{\delta}_{n-1}$ is the average of $n{-}1$ observations
$\delta_n$ is the nth or latest observation.

Each value of heading error $\delta_n$, generated by the heading error computer 10 appears on the wiper of potentiometer 84. The value of $\bar{\delta}_{n-1}$ is stored on another potentiometer 94. The required ratios $(n{-}1)/n$ and $1/n$ are obtained from the resistor chains 96, 98, 100 and 102 and 104, 106, 108 and 110, respectively, in which the switches 112, 114, 116, 118, 120, and 122 are controlled by a commutator 124 on a mechanical counter 126 which is driven to correspond to the number of observations accepted for averaging. The switches 112, 114, 116, 118, 120 and 122 are set according to the following binary schedule:

| m = made | o = open. | | | | | | |
|---|---|---|---|---|---|---|---|
| n | 112 | 114 | 116 | 118 | 120 | 122 | n−1/n | 1/n |
| 1 | m | m | m | o | o | o | o | 1 |
| 2 | o | m | m | m | o | o | 1/2 | 1/2 |
| 3 | m | o | m | o | m | o | 2/3 | 1/3 |
| 4 | o | o | m | m | m | o | 3/4 | 1/4 |
| 5 | m | m | o | o | o | m | 4/5 | 1/5 |
| 6 | o | m | o | m | o | m | 5/6 | 1/6 |
| 7 | m | o | o | o | m | m | 6/7 | 1/7 |
| 8 | o | o | o | m | m | m | 7/8 | 1/8 |

Thus for any number of observations n, the voltage appearing at the centerpoint 128 of the resistor chains will contain the correct proportions of the previous average $\bar{\delta}_{n-1}$ from potentiometer 94 and the new observation $\delta_n$ from potentiometer 84 and will thus prevent the new average $\bar{\delta}_n$ of n heading error observations to high input impedance summing amplifier 128.

A single servo system is time shared for all the computing functions of both the averager and the drift rate computer and consists of a summing amplifier 128, servo amplifier 130, and a servo motor 132 with velocity feedback from a tachogenerator 134. The servo motor 132 drives, via a 30:1 gear train 136, the shaft 138 to which any one of four potentiometers 94, 140, 142 and 144 can be connected through electrically operated clutches 146, 148, 150 and 152, respectively. The selection of inputs to the servo system via switches 154, 156, 158, 160 and 162 and the operation of the clutches 146, 148, 150 and 152 and the counter 126 with its commutator 124 are controlled by a switching logic unit 164.

The averager operates in the following sequence in the case of a single observation of heading error $\delta_1$. First, assume that the counter 126 is set to zero and is ready for the averaging of a number of observations of $\delta$ and that the first observation $\delta_1$ has been processed through the heading error computer 10 so that a value of heading error $\delta_1$ appears on output potentiometer 84. When switching logic 164 is in its quiescent state, the summing amplifier input switches 154 and 156 are made and clutch 146 is engaged. Any voltage appearing on cumulative average $\bar{\delta}_{n-1}$ potentiometer 94 is fed to summing amplifier 128 through a resistor 104 and switch 156. The voltage appearing on the final average $\bar{\delta}_n$ potentiometer 140 is fed to the summing amplifier 128 through the resistor 166 and switch 154.

The servo system 130, 132, 134, 136 and 138 will drive the cumulative average potentiometer 94 until its output voltage is equal to that of the final average potentiometer 140. In this manner, the value of the old average $\bar{\delta}_n$ is stored on potentiometer 94.

When the operator presses the accept switch 92, the contact 92a will be made momentarily, activating switching logic 164. The switching logic 164 transmits a signal to the mechanical counter 126 advancing it to read "1" and setting the commutator 124 to the $n = 1$ position so that switches 112, 114 and 116 are made and switches 118, 120 and 122 are open.

The resultant voltage at the center point 128 of the resistor chains will equal the heading error $\delta_1$ voltage on potentiometer 84 (that being the average for the single observation registered on the counter 126). For a period of four seconds the switching logic 164 also causes the switch 154 to be made, switch 156 to be opened, clutch 146 to be disengaged, switch 158 to be made, and clutch 148 to be engaged.

The inputs to the summing amplifier 128 will now be the $\delta_1$ voltage on potentiometer 84 via center point 128 and whatever voltage appears on potentiometer 140; the servo system 130, 132, 134, 136 and 138 will drive the average potentiometer 140 through the differential gear 168 until these two voltages are equal. This setting of the potentiometer 140 holds for subsequent output the average of the observations of heading error accepted by the operator, in this case the value $\delta_1$ of the single observation.

The output of the differential 168 also drives the display readout 170 which makes the required correction $\bar{\delta}_n$ available to the aircraft heading reference system 16 at contact 172b by means of a gear train 174 of suitable ratio which drives output transducer 176. After the four second period, the switching logic 164 will return to the quiescent state in which switches 154 and 156 are made, clutch 146 is engaged, switch 158 is open, and clutch 148 is disengaged. The servo system 130, 132, 134, 136 and 138 now drives the storage potentiometer 94 so that it generates a voltage representing the average heading error $\bar{\delta}_n$ generated on potentiometer 140 during the preceding averaging process. This voltage is stored in readiness for the next averaging process.

Assume now that a second observation of heading error $\delta_2$ has been processed through the heading error computer 10 and now appears on potentiometer 84. When the accept switch 92 is pressed the switching logic 164 is again activated. The counter 126 is advanced to read "2" and the commutator 124 opens resistor switch 112, makes switches 114, 116, 118 and opens switches 120 and 122. Thus the voltage at center point 128 represents the sum of one half the voltage on potentiometer 84 (the new observation $\delta_2$) and one half the voltage on potentiometer 94 (the previous average of one observation $\delta_1$). This voltage represents the average $\bar{\delta}_2$ of the two observations $\delta_1$ and $\delta_2$ accepted by the operator. The switching logic 164 then sequences the servo system 130, 132, 134, 136 and 138 to drive the average potentiometer 140 to this new average value $\bar{\delta}_2$ and then to set the storage potentiometer 94 to the same value, as described above. This process is repeated at each subsequent acceptance with the ratios of the resistor chains altered progressively to give the correct average of the number of observations. For instance for the 4th observation the ratios will be one quarter of the new observation and three quarters of the previous average.

Provision is made for the operator to reject an observation of heading error rather than pass it to the averager 9. When the reject switch 78 is pressed, the clutch 76 in the heading error computer 10 is disengaged and the spring return 80 drives the display readout 82 and the potentiometer 84 to their zero positions. When the mode switch 56 is in either the fixpoint or align positions, readout 82 and potentiometer 84 will remain in their zero positions after the reject switch 78 is released. When switch 56 is in the external position, potentiometer 84 and readout 82 will take up the latest value of the external heading error measurement from system 34 when the reject switch 78 is released.

The heading correction generated in the output transducer 176 is transmitted to the aircraft heading reference only at the operator's command. When the operator presses the correction insert switch 178 the contact 178a is made momentarily, energizing the insert relay 172 through the hold-on contact 172a. The contact 172b is made and the correction signal from the output transducer 176 is transmitted to the heading reference system 16.

The heading correction $\bar{\delta}_n$ transmitted to the heading reference 16 will also be added into the display readout 180 which indicates the accumulated corrections in the following manner. When the insert relay is de-energized contact 172c is open and clutch 182 is disengaged, the display readout 180 will remain at its existing reading. Contact 172d is also open and the servo motor 184 drives the potentiometer 186 to its zero position. When the insert relay 172 is energized by pressing the correction insert switch 178, the contacts 172c and 172d are made. The clutch 182 is now engaged and the servo motor 184 drives the potentiometer 186 to a position representing the same value of heading correction as appears on potentiometer 140 and the correction readout 170. The display readout 180 is simultaneously driven through clutch 182 so that the same value of heading correction is added to the existing reading thus progressively accumulating the sum of the corrections, $\Sigma \bar{\delta}_n$, transmitted to the heading reference 16.

The heading reference system 16 is protected by an electrical interlock from changes in the indicated correction $\bar{\delta}_n$ during the averaging process. The interlock functions as follows: when the accept switch 92 is pressed, contact 92b is opened, breaking the hold-on supply to the insert relay 172. The relay is de-energized and contacts 172 are opened, isolating the heading reference system 16 from the output transducer 176.

The averaging process is also protected so that averaging cannot be initiated unless the mode switch 56 is in the align or external position. In these positions, contact 56c is made and the switching logic 164 can be activated by pressing the accept switch 92. If on the basis of experience in heading system operation established procedures the value of $\bar{\delta}_n$ is unacceptable as a heading correction, provision is made for the operator to adjust the value of the heading correction actually transmitted to the heading reference 16. The operator may apply an adjustment through the set knob 186 to the differential gear 168 where it is added or subtracted from the computed correction $\bar{\delta}_n$. This adjustment causes the readout 170, the average potentiometer 140, and output transducer 176 to indicate the modified correction. The modified correction is also applied to the accumulated correction readout 180 and the storage potentiometer 94 through the normal operation of the servo drives to these components after the setting of the average potentiometer 140. The drift rate computer 8 is mechanized to calculate the mean drift rate of the heading reference system 16 in the interval between successive heading alignments. The drift rate computer solves the equation:

$$\dot{\delta} = \frac{\bar{\delta}_{t2} \bar{\delta}_{t1}}{t_2 - t_1} \quad (7)$$

where
$\dot{\delta}$ = mean drift rate.
$\bar{\delta}t_1$ = heading correction at time $t_1$.
$\bar{\delta}t_2$ = heading correction at time $t_2$.

The drift rate computer time shares the servo system 130, 132, 134, 136 and 138 with the averager 9 just described. The drift rating procedure is controlled by the switching logic unit 164 in the following sequence. First, assume that a series of observations of heading error have been processed through the heading error computer and averager and that the latest heading correction value $\bar{\delta}t_2$ is established on the average potentiometer 140. Assume also that the value of heading correction obtained from the next previous set of observations $\bar{\delta}t_1$ is set in a storage potentiometer 142 and that the timing mechanism indicated generally at 188 is accumulating the time elapsed (since the end of the acquisition of the previous observations $\bar{\delta}t_1$) on the timer potentiometer 190. In the quiescent state of switching logic 164 the following conditions exist:

a. The timing motor switch 192 is made and the clutch 194 is engaged so that the synchronous motor 196 is driving, through a 1:50,000 gear train 198, the differential gear 200, the clutch 194 and spring return 202 so that the wiper of the timer potentiometer 190 generates a voltage representing the time elapsed since the timer was set in motion. The time display readout 204 also indicates that elapsed time. (b) In the averager 9 at summing amplifier 128, the switch 156 is made and clutch 146 is engaged so that the current value of heading correction $\delta t_2$ is stored on potentiometer 94 for subsequent averaging procedures. Switch 158 is open and clutch 148 is disengaged because the latest averaging process has been completed. (c) In the drift rate computer 8, the summing amplifier 128 input switches 160 and 162 are open and clutches 140 and 152 are disengaged and the interlock switch 206 is made.

The rating computation is initiated when the operator presses the rate switch 208 to activate the switching logic unit 164 in the following sequence. For a computation interval of four seconds, the timing motor switch 192 is open, the clutch 194 remains engaged, the interlock switch 206 is open, the summing amplifier 128 input switches 154 supplying $\bar{\delta}t_2$, 160 supplying $\Delta t$, and 162 supplying $\bar{\delta}t_2$ are made and switches 156 and 158 are open, clutch 152 is engaged and clutches 146, 148 and 150 are disengaged. Under these conditions, the timing mechanism 188 is stopped so that potentiometer 190 and the readout 204 register the elapsed time $\Delta t$ between the two heading correction measurements.

The output of the potentiometer 190 is fed to an excitation amplifier 210 which excites the center-tapped winding of the rate potentiometer 144 with a voltage proportional to the elapsed time. The summing amplifier 128 receives voltages from potentiometer 140 through resistor 166 representing the current value of heading correction $\bar{\delta}t_1$, from potentiometer 142 through resistor 212 representing the previous value of heading correction $\bar{\delta}t_2$, and $\Delta t$ from the wiper of potentiometer 144 through resistor 214. The servo system 130, 132, 134, 136 and 138 drives (through clutch 152 and the differential gear 216) the wiper of potentiometer 144 until the servo is nulled so that the wiper position represents the drift rate according to the solution:

Elapsed time x wiper position = New heading correction
− old heading correction $$(t_2 - t_1)\dot{\delta} = \bar{\delta}_{t2} - \bar{\delta}_{t1} \quad (8)$$

or $$\dot{\delta} = \frac{\bar{\delta}_{t2} - \bar{\delta}_{t1}}{t_2 - t_1}$$

It may be noted that equation 8 is obtained essentially by placing $\overline{\delta t_2}$ on a plus input to the summing amplifier 128, placing $\overline{\delta t_1}$ on a negative input so that the output is the difference and then nulling the servo by having the wiper of potentiometer 144 tap off a proportional amount of the elapsed time voltage applied across potentiometer 144. Hence, the wiper of potentiometer 144 carries a voltage representing the drift rate $\dot{\delta}$.

The output of the differential 216 also drives the display readout 218 which indicates the drift rate correction $\dot{\delta}$ required by the aircraft heading reference system 16 and through a gear train 220 of a suitable ratio drives an output transducer 222 which will transmit the correction signal $\dot{\delta}$ to the heading reference 16.

After the first four-second computation period, for a further four-second period, the timing motor switch 192 remains open, clutch 194 is now disengaged, the interlock switch 206 is now closed, the amplifier switches 156, 158 and 160 are now opened and 154 and 162 remain closed, clutch 150 is now engaged, clutches 146 and 148 remain disengaged, and clutch 52 is now disengaged. Under these conditions, the spring return 202 drives the timer potentiometer 190 and elapsed time readout 204 to their zero positions, the summing amplifier 128 continues to receive input from the average $\overline{\delta t_2}$ potentiometer 140 and input $\overline{\delta t_1}$ from the storage potentiometer 142 and the servo system 130, 132, 134, 136 and 138 drives the storage potentiometer 142 until it registers the same value of heading correction $\overline{\delta t_2}$ as potentiometer 140. After this 4-second period, the switching logic 164 returns to the quiescent state. The timing motor switch 192 is made and clutch 194 is engaged so that the timing mechanism 188 starts accumulating elapsed time and the servo system is ready for the next averaging or drift rate computing operation.

The drift rate computing procedure is initiated only when required by the operator and does not have to be carried out after each set of observations made to measure the heading correction $\overline{\delta_n}$. However, if at any time, the heading reference system 16 is corrected by inserting the computed heading correction $\overline{\delta_n}$, the drift rate computer 8 must be reset to establish the new initial conditions. This is achieved by automatically initiating the rate computing process whenever the heading correction insert switch 178 is operated. The contact 178b is made momentarily thus activating the switching logic 164 in its rate computing mode. The rate computing process is initiated in the same sequence as is described above for operating the rate switch 208 with the single exception that during the second four-second period the amplifier input switch 154 is open instead of made. Thus, the storage potentiometer 142 is driven to its zero position; this is consistent with the fact that at this time the measured error $\overline{\delta_n}$ in the heading reference 16 is removed by the insertion of the correction and the initial condition for any subsequent rate computation must be zero heading error at the time of insertion.

The drift rate correction generated in the output transducer 222 is transmitted to the aircraft heading reference system 16 only at the operator's command. When the operator presses the rate insert switch 224 the switch is made momentarily, the insert relay 226 is energized and remains energized through the hold-in contact 226a. The contact 226b is made, allowing the correction signal from the output transducer 222 to be transmitted to the heading reference system 16.

The heading reference system 16 is protected from changes in the indicated rate correction during the computing process by an electrical interlock. When the computing process is initiated by pressing the rate insert or correction insert switches 224 or 178, the interlock switch 206 is opened so that the insert relay 226 is de-energized and contact 226a is opened isolating the heading reference system 16 from the output transducer 222.

The types of output transducers 176 and 222 are not specified here since they are dependent on the requirements of the heading reference system 16 to which the alignment system is to be connected. Any one of a range of transducers can be provided in each case including: a synchro transmitter, an AC potentiometer or a DC potentiometer.

From the above description it can be seen that the apparatus of this invention is capable of computed heading error, averaged heading error and drift rate based on input signals readily obtainable from the existing navigation system by means of the procedure outlined above. The mechanization of the calculation removes a significant burden from the navigator's workload. The displays permit the navigator to check and alter the computed heading and drift rate corrections. The radar offset sighting method provides an all-weather capability for measuring heading error. Use of the apparatus of this invention can improve the accuracy of the heading reference of a ship or vehicle by an order of magnitude.

What is claimed is:

1. For use with a navigation system that has the capability of providing output signals corresponding to the coordinates of one radar sighting aimpoint with respect to a second radar sighting aimpoint and signals corresponding to the components of a displacement vector for linking first and second points on a radar display, a heading error computation system comprising means for computing the angle whose tangent is the quotient of the coordinates of said first radar sighting aimpoint with respect to the second radar sighting aimpoint, means for displacing and measuring the displacement of coordinates of said second radar sighting aimpoint by manual adjustment, means for summing the coordinates of said first radar aimpoint with respect to said second radar aimpoint and said manual displacement to coordinates of said second radar aimpoint along the same axes in two dimensional space, means for computing a second angle whose tangent is the quotient of said summed coordinates, and means for substracting said firstmentioned angle from said second angle to obtain the heading error angle.

2. The apparatus according to claim 1 further including means operatively associated with said subtracting means for averaging a plurality of values of said heading error angle.

3. The apparatus according to claim 2 wherein said averaging means comprises means for storing a cumulative average of heading error angles, means for forming the product of said cumulative average and a ratio which is a function of the number of values of the heading error angle included in said cumulative average, means for introducing another value of the heading error angle, means for forming the product of said second heading error angle and a ratio which is a function of the number of values in said cumulative average, and means for summing said first mentioned product and said second mentioned product to obtain a new value of said cumulative average, and means for storing said new value.

4. The apparatus according to claim 1 further including a drift rate computing unit comprising means for storing the average of a first set of heading error angle observations, means for subtracting a second set of averaged heading error angle observations from said first set to obtain the difference, and means for dividing said difference by the time elapsed between the acquisition of the two sets of averaged heading error angle observations to determine the drift rate of the heading error angle.

5. The apparatus according to claim 3 further including a drift rate computing unit comprising means for storing the average of a first set of heading error angle observations, means for subtracting a second set of averaged heading error angle observations from said first set to obtain the difference, and means for dividing said difference by the time elapsed between the acquisition of the two sets of averaged heading error angle observations to determine the drift rate of the heading error angle.

6. A heading error angle averaging unit comprising means for storing a cumulative average of heading error angles, means for forming the product of said cumulative average and a ratio which is a function of the number of values of said heading error angle included in said cumulative average, means for introducing another value of the heading error angle, means for forming the product of said other value of heading error angle and a ratio which is a function of the number of values in the said cumulative average, means for summing said first mentioned product and said second mentioned product to obtain a new value of said cumulative average, and means for storing said new value.

7. A drift rate computation unit for navigation systems capable of providing heading error angle observations comprising means for storing the average of a first set of heading error angle observations, means for subtracting a second set of averaged heading error angle observations from said first set to obtain the difference, and means for dividing said difference by the time elapsed between the acquisition of the two sets of averaged heading error angle observations to determine the drift rate of the heading error angle.

8. The apparatus according to claim 7 further including means for storing a cumulative average of said heading error angles, means for forming the product of said cumulative average and a ratio which is a function of the number of values of said heading error angle included in said cumulative average, means for introducing another value of the heading error angle, means for forming the product of said second mentioned heading error angle and a ratio which is a function of the number of values of said heading error in said cumulative average, means for summing said first mentioned product and said second mentioned product to obtain a new value of said cumulative average, and means for storing said new value.

9. For use with a vehicle navigation system that includes a dead reckoning navigation unit which continuously computes the present position of the vehicle being navigated using inputs from a gyro heading reference and a velocity sensor, a sighting computer which calculates the bearing and distance from the computed present position of said vehicle to selected radar sighting aimpoints and a mapping radar system having a display screen provided with cross hair indices and capable of receiving and displaying radar signals on said screen and also capable of automatically driving said cross hair indices to a position on said radar display screen representing the computed position of a radar sighting aimpoint as calculated by said sighting computer and wherein said navigation system further includes means for providing output signals corresponding to the coordinates of a second radar sighting aimpoint with respect to the first radar sighting aimpoint and signals corresponding to the components of a vector on said radar display screen representing the displacement from said computed second display point to which said cross hair indices are driven automatically to said second mentioned radar sighting aimpoint by manually trimming said cross hairs, a heading error computation system comprising means for computing the angle whose tangent is the quotient of the coordinates of said first radar sighting aimpoint with respect to said second radar sighting aimpoint, and means for converting said components of said vector into the displacement coordinates of said second radar display point from said computed second display point, means for summing the coordinates of said first radar aimpoint with respect to said second radar aimpoint and the displacement coordinates of said computed second display point with respect to said second radar display point along the same axes in two dimensional space, means for computing a second angle whose tangent is the quotient of said summed coordinates, and means for subtracting said first mentioned angle from said second angle to obtain the heading error angle.

10. The apparatus according to claim 9 further including means connected to said subtracting means for averaging a plurality of values of said heading error angle.

11. The apparatus according to claim 10 wherein said averaging means comprises means for storing a cumulative average of heading error angles, means for forming the product of said cumulative average and a ratio which is a function of the number of values of the heading error angle included in said cumulative average, means for introducing another value of the heading error angle, means for forming the product of said other value of the heading error angle and a ratio which is a function of the number of values in the said cumulative average, and means for summing said first mentioned product and said second mentioned product to obtain a new value of said cumulative average, and means for storing said new value.

12. The apparatus according to claim 9 further including a drift rate computing unit comprising means for storing the average of a first set of heading error angle observations, means for subtracting a second set of averaged heading error angle observations from said first set to obtain the difference, and means for dividing said difference by the time elapsed between the acquisition of the two sets of averaged heading error angle observations to determine the drift rate of the heading reference system.

13. The apparatus according to claim 11 further including a drift rate computing unit comprising means for storing the average of a first set of heading error angle observations, means for subtracting a second set of averaged heading error angle observations from said first set to obtain the difference, and means for dividing said difference by the time elapsed between the acquisition of the two sets of averaged heading error angle observations to determine the drift rate of the heading reference system.

14. The method of measuring the error in the heading reference of a navigational system which includes a dead reckoning navigation unit that continuously computes the present position of the vehicle being navigated using inputs from a gyro heading reference and a velocity sensor, a sighting computer which calculates the bearing and distance from the computed present position of said vehicle to selected aimpoints and a mapping radar system having a display screen provided with cross hair indices and capable of receiving and displaying radar signals on said screen and also capable of automatically driving said cross hair indices to a position on said radar screen representing a radar sighting aimpoint as calculated by said sighting computer comprising the steps of:

a. selecting a radar sighting aimpoint whose position is known;
b. driving said cross hair indices to the position of said radar display screen representing said radar sighting aimpoint;
c. scanning said radar sighting aimpoint with said radar to obtain a radar display point on said radar screen representing the radar return signal from said radar sighting aimpoint;
d. aligning said cross hair indices with said radar return point on said radar screen to place the cross hairs precisely over the said radar return;
e. selecting a second radar sighting aimpoint whose position is known;
f. driving said cross hair indices to the position on said radar screen corresponding to said second radar sighting aimpoint as calculated by said sighting computer;
g. scanning said second radar sighting aimpoint with said radar to obtain a return signal from said second radar sighting aimpoint; and
h. measuring with respect to the return from the said second sighting aimpoint the difference in angular position between the position of said cross hair indices and the radar return from said second radar sighting aimpoint to obtain said error in said heading reference.

* * * * *

PO-1050
(5/69)

UNITED STATES PATENT OFFICE
CERTIFICATE OF CORRECTION

Patent No. 3,683,378      Dated August 8, 1972

Inventor(s) William L. Polhemus

It is certified that error appears in the above-identified patent and that said Letters Patent are hereby corrected as shown below:

Col. 4, cancel line 6; line 7, cancel "heading error".

Col. 5, last line - after "point" insert -- F --.

Col. 6, line 61, "computer" (second occurrence) should be -- computed --.

Col. 7, line 19, "$\Upsilon$ racking" should be -- tracking --.

Col. 8, line 38, after "generally" insert -- at 8 --.

Col. 9, line 40, "EN" should be -- E $\div$ N --.

Col. 13, the equation is not correct, it should be --

$$\dot{\delta} = \frac{\bar{\delta}t_2 - \bar{\delta}t_1}{t_2 - t_1}$$

Col. 13, line 57, "$\delta$" should be -- $\dot{\delta}$ --.

Col. 14, line 22, "$\delta t_2$" should be -- $\bar{\delta}t_2$ --.

Col. 15, line 22, "52" should be -- 152 --.

Signed and sealed this 9th day of January 1973.

(SEAL)
Attest:

EDWARD M. FLETCHER, JR.          ROBERT GOTTSCHALK
Attesting Officer                     Commissioner of Patents